United States Patent Office 3,793,335
Patented Feb. 19, 1974

3,793,335
MANUFACTURE OF 1,1' - DISUBSTITUTED-4,4'-BIPYRIDYLIUM SALTS AND RELATED COMPOUNDS
John Beacham and John Gerard Carey, Runcorn, England, assignors to Imperial Chemical Industries Limited, London, England
No Drawing. Filed Jan. 18, 1971, Ser. No. 107,412
Claims priority, application Great Britain, Jan. 23, 1970, 3,433/70
Int. Cl. C07d 31/42, 31/44
U.S. Cl. 260—295 AM                                9 Claims

ABSTRACT OF THE DISCLOSURE

A process for the manufacture of a 1,1'-disubstituted-4,4'-bipyridylium cation radical which comprises mixing a solution of a 1,1'-disubstituted-1,1'-dihydro-4,4'-bipyridyl with a 1,1'-disubstituted-4,4'-bipyridylium salt to form the 1,1'-disubstituted-4,4'-bipyridylium cation radical.

---

This invention relates to the manufacture of heterocyclic bases and particularly to a process for the manufacture of 1,1'-disubstituted-4,4'-bipyridylium cation radicals which are readily oxidized to 1,1'-disubstituted-4,4'-bipyridylium salts which are useful herbicides.

It is known that 1,1'-disubstituted-4,4'-bipyridylium salts can be prepared by oxidation of the corresponding 1,1'-disubstituted-1,1'-dihydro-4,4'-bipyridyl. Thus in Belgian patent specification No. 730,886 there is described and claimed a process for the manufacture of 1,1'-disubstituted bipyridylium salts which comprises treating the corresponding 1,1'-disubstituted-1,1'-dihydrobipyridyl with oxygen or an oxidizing agent which is an electron acceptor and which has a redox potential in water more positive than −0.50 volt as compared with the saturated calomel electrode. The reaction may be carried out in the presence of a solvent for the dihydrobipyridyl and a variety of inorganic and organic oxidizing agents may be employed, for example metal salts, inorganic oxyacid anhydrides and quinones.

Also, in Belgian specification No. 735,348 we have described and claimed a process for the manufacture of 1,1'-disubstituted-4,4'-bipyridylium salts wherein each of the substituents contains up to 10 carbon atoms which comprises reacting an N-substituted pyridinium salt with a cyanide under basic conditions and subsequently oxidizing the resulting interaction product. The cyanide is preferably an alkali metal cyanide, notably sodium cyanide. It is further described that the interaction product derived from the pyridinium salt and the cyanide is readily oxidized to the corresponding bipyridylium salt by treatment with air or with an oxidizing agent, and that oxidation may be carried out prior to or subsequent to isolation of the intermediate interaction product. It is usually more convenient, as described, to isolate the intermediate reaction product prior to oxidizing it and a technique for doing this is by solvent-extraction using an organic solvent, for example an aromatic hydrocarbon and notably toluene. The interaction product is in fact a 1,1'-disubstituted-1,1'-dihydro-4,4'-bipyridyl.

Oxidation of 1,1'-disubstituted dihydrobipyridyls is in fact a two-stage process wherein the dihydrobipyridyl is firstly oxidized to the 1,1'-disubstituted-4,4'-bipyridylium cation radical which is further oxidized in a second stage to the 1,1'-disubstituted-4,4'-bipyridylium dication. We have now devised a particularly convenient method for converting dihydrobipyridyls into bipyridylium cation radicals.

According to the present invention we provide a process for the manufacture of a 1,1'-disubstituted-4,4'-bipyridylium catio radical which comprises mixing a solution of a 1,1'-disubstituted-1,1'-dihydro-4,4'-bipyridyl with a 1,1'-disubstituted-4,4'-bipyridylium salt to form the 1,1'-disubstituted-4,4'-bipyridylium cation radical. Usually, but not necessarily, the 1,1'-substituents of the bipyridylium salt will be the same as the 1,1'-substituents of the dihydrobipyridyl with which it is mixed, and normally the bipyridylium salt will be employed in the form of its aqueous solution. The 1,1'-disubstituted-4,4'-bipyridylium cation radical is readily oxidized to a 1,1'-disubstituted-4,4'-bipyridylium salt.

The solution of the dihydrobipyridyl can conveniently be that obtained as, or by solvent-extraction of, the reaction mixture in which it has been prepared. As described in Belgian specification No. 735,348 suitable solvents for the dihydrobipyridyl are hydrocarbons, particularly aromatic hydrocarbons and notably toluene. A particularly suitable solution of the dihydrobipyridyl is that obtained by solvent-extraction of the reaction mixture obtained by reacting an N-substituted pyridinium salt and a cyanide, as described.

The 1,1'-disubstituted-4,4'-bipyridylium salt is usually employed in the form of an aqueous solution in which case the resulting 1,1'-disubstituted-4,4'-bipyridylium cation radical will be in the aqueous phase. By employing a solution of the dihydrobipyridyl in a substantially water-immiscible organic solvent, the product of the reaction is an aqueous phase containing the bipyridylium cation radical and a substantially pure organic solvent phase. Separation of the phases provides substantially pure and oxygen-free solvent for re-use.

The anionic species of the bipyridiylium salt is not critical and does not affect nor is affected by the reaction, and can be for example a chloride, acetate or methosulphate anion. Similarly in the case where the dihydrobipyridyl is derived from an N-substituted pyridinium salt, the anionic species of this salt is not critical.

The 1,1'-disubstituted-4,4'-bipyridylium cation radical produced in the process of the invention can be readily oxidized in a second stage to the corresponding bipyridylium dication by a variety of oxidizing agents including air or oxygen. Oxidizing agents other than oxygen or air which can be used are those having a redox potential in an aqueous medium more positive than −0.50 volt as compared with the saturated calomel electrode. Examples of suitable inorganic oxidizing agents are metal salts, for example ceric sulphate (in dilute sulphuric acid), and metal halides; inorganic oxyacid anhydrides, especially sulphur dioxide; chlorine; and organic oxidizing agents, notably quinones for example benzoquinone, chloranil and anthraquinone.

Oxidation of the bipyridylium cation radical is advantageously carried out under acidic conditions, the pH of the reaction mixture being preferably from 4 to 6. Addition of the oxidizing agent in an acidic medium is usually sufficient to achieve this result, or alternatively free acid may be added to the reaction medium prior to the oxidizing agent.

In cases where the desired 1,1'-disubstituted-4,4'-bipyridylium salt is a chloride salt, a particularly suitable oxidizing agent for effecting the second stage oxidation to the bipyridylium salt is chlorine. In this case the 1,1'-disubstituted-4,4'-bipyridylium salt with which the solution of the dihydrobipyridyl is mixed can be conveniently the chloride salt.

The product of oxidation of the bipyridylium cation radical is usually an aqueous solution of the 1,1'-disubstituted-4,4'-bipyridylium salt and this may be employed directly as a herbicide, if desired after suitable formulation for example with wetting agents. Alternatively the reaction mixture can be treated with water to yield an aqueous solution of the bipyridylium salt. The aqueous solution of the bipyridylium salt is essentially free from impurities and a portion of this solution may be employed as the reagent for mixing with and effecting oxidation of a further amount of the solution of the dihydrobipyridyl to convert the latter into the bipyridylium cation radical.

The temperature at which the first-stage oxidation is carried out is not critical. We prefer to carry out the reaction at a temperature of from 15° C. to 80° C. and conveniently at room temperature. The second-stage oxidation is also carried out conveniently at room temperature. The second-stage oxidation is exothermic and we prefer to cool the mixture to prevent a rise in temperature to above 80° C.

The amount of the 1,1'-disubstituted-4,4'-bipyridylium salt which is mixed with the solution of the dihydrobipyridyl is not critical but will usually be at least 1 mole of the bipyridylium salt per mole of the dihydrobipyridyl in order to effect complete conversion of the dihydrobipyridyl to the bipyridylium cation radical. We prefer to employ an excess of the bipyridylium salt. Mixing of the solution of the dihydrobipyridyl with the bipyridylium salt results in the formation of 1,1'-disubstituted-4,4'-bipyridylium cation radical both by oxidation of the dihydrobipyridyl and simultaneous reduction of the bipyridylium salt. Oxidation of the bipyridylium cation radical to the bipyridylium dication can be carried out quantitatively and complete conversion of the dihydrobipyridyl to the bipyridylium salt can be achieved. As stated hereinbefore the 1,1'-substituents of the bipyridylium salt will normally be the same as the 1,1'-substituents of the dihydrobipyridyl so that the mixture obtained contains a single species of 1,1'-disubstituted-4,4'-bipyridylium cation radical. It will be appreciated that any 1,1'-disubstituted-4,4'-bipyridylium salt which does not react with the dihydrobipyridyl will be carried through unchanged in the aqueous phase and thus appear in the final product.

The process of the invention has the advantage over the processes described in Belgian specification No. 735,-348 mentioned hereinbefore that it is easy to carry out and does not present any problems in handling the reaction mixtures. We have found that if solutions of 1,1'-disubstituted dihydrobipyridyls in organic solvents (as is usual) are oxidized directly to the corresponding bipyridyl salts in the presence of water employing for example chlorine as the oxidizing agent, there is a substantial danger of creating an emulsion. The first-stage of such an oxidation process involves the conflcting requirements of high-speed stirring to assist rapid diffusion of the chlorine throughout the reaction mixture and low-speed stirring to produce adequate mixing without creating an emulsion; such emulsions have a relatively long life so that phase-separation requires long periods of time. In the process of the present invention there are no difficulties associated with the oxidation even when using chlorine as the oxidizing agent in the second stage.

A second disadvantage of the direct oxidation using an oxidizing agent in both stages of oxidation is the likelihood of contamination of the organic solvent-phase by the oxidizing agent, thus necessitating its purification for re-use. In the process of the present invention, on the other hand, the solvent need not be brought into contact with the oxidizing agent so that it can be re-used without purification.

The invention is illustrated but in no way limited by the following examples.

EXAMPLE 1

A solution of 1,1'-dimethyl-1,1'-dihydro-4,4'-bipyridyl in toluene was prepared by reacting N-methyl pyridinium ion (20 g.) in the form of N-methyl pyridinium chloride with an aqueous solution (110 mls.) of sodium cyanide (16.7 g.) and sodium hydroxide (6.7 g.) under reflux conditions for two hours followed by extraction of the reaction mixture with toluene (400 mls.).

The solution in toluene was mixed thoroughly by stirring with an aqueous solution (125 mls.) of 1,1'-dimethyl-4,4'-bipyridylium dichloride (51 g.). The mixture was allowed to stand after which the resulting toulene layer was removed in a separating funnel. The toluene was essentially pure and was suitable for re-use. The aqueous phase, which contained 1,1'-dimethyl-4,4'-bipyridylium cation radical and which was blue in color, was stirred at a stirrer speed of 600 r.p.m. and gaseous chlorine was bubbled through it until complete conversion of the cation radical to 1,1'-dimethyl-4,4'-bipyridylium dichloride (64.3 g.) had occurred; the end point was determined by a change in potential across a pair of electrodes (a saturated calomel electrode and a platinum electrode) immersed in the solution. The solution changed in color from blue to dark yellow at the end point.

The reaction efficiency was 67% based on the pyridinium salt fed.

EXAMPLE 2

A solution of 1,1'-dimethyl-1,1'-dihydro-4,4'-bipyridyl in toluene was prepared by reacting N-methyl pyridinium ion (10 g.) in the form of N-methyl pyridinium chloride with an aqueous solution (100 mls.) of sodium cyanide (16.7 g.) and sodium hydroxide (10 g.) under reflux conditions for two hours followed by extraction of the reaction mixture with toluene (200 mls.).

The solution in toluene was mixed thoroughly by stirring with an aqueous solution (73.5 mls.) of 1,1'-dimethyl-4,4'-bipyridylium dichloride (17.2 g.). The mixture was allowed to stand after which the resulting toluene layer was removed in a separating funnel. The toluene was essentially pure and was suitable for re-use. The aqueous phase, which contained 1,1-dimethyl-4,4'-bipyridylium cation radical and which was blue in color, was stirred at a stirrer speed of 600 r.p.m. and gaseous chlorine was bubbled through it until complete conversion of the cation radical to 1,1'-dimethyl-4,4'-bipyridylium dichloride (24.4 g.) had occurred; the end point was determined by a change in potential across a pair of electrodes (saturated calomel and platinum) immersed in the solution. The solution changed in color from blue to dark yellow at the end point.

The reaction efficiency was 70% based on the pyridinium salt fed.

Similar results were obtained using N-(N,N-dimethyl carbamidomethyl)-pyridinium dichloride, instead of N-methyl pyridinium chloride, to produce 1,1'-di(N,N-dimethyl carbamidomethyl)-bipyridylium dichloride.

EXAMPLES 3 and 4

N-methyl pyridinium ion (20 g.) in the form of N-methyl pyridinium chloride was reacted with an aqueous solution (200 mls.) of sodium cyanide (33.4 g.) and sodium hydroxide (20 g.) under reflux conditions for two hours. The resulting mixture was extracted with monochlorobenzene (400 mls.) to form a solution of 1,1'-dimethyl-1,1'-dihydro-4,4'-bipyridyl in toluene.

The solution in monochlorobenzene (upper layer) was separated and reacted with an aqueous solution (95.5 g.) of 1,1'-dimethyl-4,4'-bipyridylium dichloride (18.3 g.) with stirring. After a period of 5 minutes the monochlorobenzene layer (bottom layer) was separated and the aqueous layer, containing 1,1'-dimethyl-4,4'-bipyridylium cation radical was stirred with an aqueous solution of sulphur dioxide. The resulting solution was analyzed for 1,1'-dimethyl-4,4'-bipyridylium ion. The analysis indicated a reaction efficiency of 65% based on N-methyl pyridinium chloride fed.

The above procedure was then repeated (Example 4) using the monochlorobenzene removed from the above reaction mixture and washed once with water before use. Analysis of the final aqueous solution for 1,1'-dimethyl- 4,4'-bipyridylium ion indicated a reaction efficiency of 58% based on N-methyl pyridinium chloride fed.

EXAMPLE 5

N-(2-hydroxy ethyl)-pyridinium chloride (4 g.—0.0271 m.) was reacted with an aqueous solution (30 mls. water) of sodium cyanide (4.9 g.—0.1 m.) and sodium hydroxide (2.5 g.—0.0625 m.) under reflux conditions for 90 minutes. The resulting mixture was extracted with methyl isobutyl ketone (100 mls.) and the resulting aqueous layer was separated and discarded.

The solution of 1,1'-di(2-hydroxy ethyl)-1,1'-dihydro-4,4'-bipyridyl in methyl isobutyl ketone was mixed with an aqueous solution (50 mls. water) of 1,1'-di(2-hydroxy ethyl)-4,4'-bipyridylium dichloride (6 g.) and the mixture was stirred for 5 minutes and then allowed to stand undisturbed for 5 minutes. The aqueous layer contained 1,1'-di(2-hydroxyethyl)-4,4'-bipyridylium cation radical, was treated with chlorine gas in the manner described in Example 2. The mixture was analyzed for 1,1'-di(2-hydroxyethyl)-4,4'-bipyridylium dichloride.

Analysis at λ 602:

$$E_{1\ cm.}^{1\%} = 434$$

pH 9.2 buffer plus sodium dithionite.

The reaction efficiency was 40% based on N-(2-hydroxyethyl)-pyridinium chloride fed.

EXAMPLE 6

N-(2-hydroxyethyl)-pyridinium chloride was reacted with an aqueous solution of sodium cyanide and sodium hydroxide as described in Example 5. The resulting solid 1,1'-di(2 - hydroxyethyl)-1,1'-dihydro-4,4'-bipyridyl was separated by filtration, washed once with oxygen-free water and then mixed with an aqueous solution (50 mls. water) of 1,1'-di(2-hydroxyethyl)-4,4'-bipyridylium dichloride (6 g.) for 5 minutes. The resulting solution was treated with chlorine as described in Example 2 and the solution so obtained was analyzed for 1,1'-di(2-hydroxyethyl)-4,4'-bipyridylium dichloride.

The reaction efficiency was 69% based on N-(2-hydroxyethyl)-pyridinium chloride fed.

EXAMPLE 7

A mixture of sodium cyanide (4.9 g.), sodium hydroxide (3.0 g.) and N-methyl pyridinium chloride (3.17 g.) in water (30 mls.) was heated at 100° C. with stirring under reflux conditions for 90 minutes. The resulting mixture was cooled and filtered.

The residue, 1,1'-dimethyl-1,1'-dihydro-4,4'-bipyridyl, was washed with oxygen-free water (2× 50 mls.) and the damp solid so obtained was treated with water (50 mls.) saturated with chlorine. The resulting slurry was stirred whilst chlorine gas was passed through it and the solution so obtained (solution A) was then analyzed for 1,1'-dimethyl-4,4'-bipyridylium dichloride. The analysis indicated 2.2 g. of the dichloride.

Solid 1,1'-dimethyl-1,1' - dihydro - 4,4'-bipyridyl was prepared as above but using half-quantities of the reagents. The solid was washed with oxygen-free water (50 mls.) and solution A was added to it, with stirring. The solution was filtered and the filtrate was treated with chlorine gas as described in Example 2. The resulting solution was analyzed and was found to contain 3.3 g. of 1,1'-dimethyl-4,4'-bipyridylium dichloride.

EXAMPLE 8

A mixture of sodium cyanide (8.5 g.—0.174 m.), sodium hydroxide (5.0 g.—0.125 m.) and N-methyl pyridinium chloride (11 g.—0.085 m.) in water (49 mls.) was heated under reflux conditions for 105 minutes. The mixture was then cooled and extracted with toluene (400 mls.) to form a solution in toluene of 1,1'-dimethyl-1,1'-dihydro-4,4'-bipyridyl. The aqueous layer was separated and the toluene layer was mixed with an aqueous solution (500 mls. water) of 1,1'-dimethyl-4,4'-bipyridylium bicarbonate (11.2 g.) After 5 minutes the aqueous layer (blue) was separated from the clear toluene layer and stirred whilst a mixture of air and carbon dioxide was passed through it to produce an aqueous solution of 1,1'-dimethyl-4,4'-bipyridylium bicarbonate.

The reaction efficiency was 51% based on N-methyl pyridinium chloride fed.

EXAMPLE 9

A solution of 1,1'-dimethyl-1,1'-dihydro-4,4'-bipyridyl (2.16 g.) in toluene (100 mls.) was reacted with an aqueous solution (50 mls. water) of 1,1'-dimethyl-4,4'-bipyridylium sulphate (4.4 g. 1,1'-dimethyl-4,4'-bipyridylium ion) at 60° C. until the toluene became clear and the aqueous phase became blue in color. The blue aqueous solution was separated and treated with an aqueous solution (50 mls. water) of copper sulphate (5.0 g. $CuSO_4 \cdot 5H_2O$). Immediately copper metal was precipitated and the blue coloration of the solution was almost discharged. Hydrogen sulphide gas was passed through the solution to precipitate any cupric ions present and the resulting solution was analyzed for 1,1'-dimethyl-4,4'-bipyridylium ion present as the sulphate. The solution contained 6.2 g. of the ion.

EXAMPLES 10–15

A mixture of N-methyl pyridinium chloride (212 g.—1.64 m.), sodium cyanide (167 g.—3.41 m.), sodium hydroxide (100 g.—2.5 m.) and water (950 mls.) was heated under reflux conditions for 105 minutes. The resulting mixture was cooled and extracted with toluene (600 mls.) to form a solution in the toluene of 1,1'-dimethyl-1,1'-dihydro-4,4'-bipyridyl. The aqueous layer was separated and discarded and the toluene layer was washed with oxygen-free water.

The solution in toluene was mixed with stirring with an aqueous solution (750 g.) of 1,1'-dimethyl-4,4'-bipyridylium dichloride (240 g./1000 g. solution). Samples of the resulting solution were removed and weighed and each was oxidized with a different oxidizing agent (see the table below) by adding the oxidizing agent (chlorine the only one in gaseous form) to the sample of the solution. In each case an aqueous solution of a 1,1'-dimethyl-4,4'-bipyridylium salt was obtained and the reaction efficiency in respect of 1,1'-dimethyl-4,4'-bipyridylium ion produced was determined. The results are shown in the table.

TABLE

| Example No. | Oxidizing agent | Reaction efficiency,[1] percent |
|---|---|---|
| 10 | Chlorine (gas) | 100 |
| 11 | Sulphur dioxide (aq) | 91.5 |
| 12 | Potassium ferricyanide (aq) | 99 |
| 13 | Ceric sulphate (aq) | 96 |
| 14 | Chloranil | 95 |
| 15 | m-Dinitrobenzene | 96 |

[1] Calculated assuming the reaction efficiency with clhorine to be 100%.

It is to be understood that in all of the preceding examples the experimental procedures described were effected under an atmosphere of nitrogen gas which was maintained until the final bipyridylium salt had been obtained.

What we claim is:

1. A process for the manufacture of a 1,1'-disubstituted-4,4'-bipyridylium cation radical which comprises mixing at 0° C. to 80° C. a 1,1-disubstituted-1,1'-dihydro-4,4'-bipyridyl with an aqueous solution of a 1,1'-disubstituted-4,4'-pyridylium salt to form the 1,1'-disubstituted-4,4'-bipyridylium cation radical, said substituents being selected from the group consisting of lower alkyl, carbamido lower alkyl and hydroxyl lower alkyl and subsequently oxidizing the 1,1'-disubstituted 4,4'-pyridylium cation radical to the corresponding 1,1'-disubstituted-4,4'-bipyridylium salt.

2. A process as claimed in claim 1 wherein 1,1'-disubstituted-1,1'-dihydro-4,4'-bipyridyl is in solution in an inert organic solvent which is substantially immiscible with water.

3. A process as claimed in claim 2 wherein the organic solvent is an aromatic hydrocarbon.

4. A process as claimed in claim 1 which is carried out at a temperature of from 15° C. to 80° C.

5. A process as claimed in claim 1 wherein there is employed at least 1 mole of the bipyridylium salt per mole of the dihydrobipyridyl.

6. A process as claimed in claim 1 wherein the 1,1'-disubstituted-4,4'-bipyridylium salt is a 1,1'-disubstituted-4,4'-bipyridylium dichloride.

7. A process as claimed in claim 1 wherein the oxidation is effected by means of an oxidizing agent having a redox potential in an aqueous medium more positive than —0.50 volt as compared with the saturated calomel electrode.

8. A process as claimed in claim 1 wherein oxidation of the bipyridylium cation radical is carried out at a pH of from 4 to 6.

9. A process as claimed in claim 1 wherein the oxidation of the bipyridylium cation radical is carried out at a temperature of below 80° C.

References Cited

Winters et al.: Tetrahedron Letters, No. 24, pp. 2313–15, Pergamon Press, 1967.

ALAN L. ROTHMAN, Primary Examiner

U.S. Cl. X.R.

260—296 D